United States Patent Office 2,862,852
Patented Dec. 2, 1958

2,862,852
STABILIZED VITAMIN D COMPOSITION

Marco Alfred Cannalonga, North Bergen, N. J., assignor to Hoffmann-La Roche Inc., Nutley, N. J., a corporation of New Jersey No Drawing. Application December 29, 1955
Serial No. 556,046

3 Claims. (Cl. 167—81)

This invention relates to an improved stabilized vitamin D composition and to a method for producing such a composition.

Vitamin D, more particularly, vitamin $D_2$ (calciferol) is included in many vitamin preparations utilized for supplementing the diets of humans or animals. This vitamin is frequently used in a dry form in preparations such as vitamin tablets, capsules, animal feeds, etc. Vitamin $D_2$, however, is a highly unstable substance subject to rapid deterioration, particularly in the presence of minerals such as iron. It is, therefore, necessary to stabilize the vitamin $D_2$ in the preparations in which it is used against the various deteriorating influences so that the activity of the vitamin is not lost before the preparation is utilized.

It has been found that a vitamin D composition stabilized against loss of activity is produced when vitamin $D_2$ is intimately admixed with minor amounts of butylated hydroxyanisole (2-t-butyl-4-hydroxyanisole and/or 3-t-butyl-4-hydroxyanisole), 2,6-di-t-butyl-4-methylphenol and ethylenediamine tetraacetic acid or an alkali metal salt, such as the disodium salt, of ethylenediamine tetraacetic acid in dry, homogeneous beadlets or granules.

The homogeneous, stabilized dry vitamin D composition is preferably prepared according to the method described in the copending application of Marco Alfred Cannalonga and Louis Magid, Serial No. 341,383, filed March 9, 1953, U. S. Patent No. 2,756,177, issued July 24, 1956. According to this method, butylated hydroxyanisole, 2,6-di-t-butyl-4-methylphenol and vitamin $D_2$ are dissolved in a vegetable oil such as corn oil, sesame oil, coconut oil, etc., and an ethylenediamine tetraacetic acid compound is added thereto. The vegetable oil mixture is then emulsified in an aqueous solution of U. S. P. gelatin and sucrose. The oil in water emulsion is sprayed in the form of fine droplets into a collecting powder which functions as a dehydrating agent. The collecting powder is a starchy powder such as starch or a dry, free-flowing, low-moisture starch ester. A preferred collecting powder is a commercially available modified starch ester (manufactured according to U. S. Patent No. 2,613,206) and distributed by National Starch Products, Inc., New York, New York, under the name "Dry-Flo." After further drying, the stabilized vitamin D composition produced is separated from the starch by screening.

The dry powder produced in this manner comprises free-flowing, spherical-shaped individual beadlets or granules in the range of about 30 to about 120 mesh size containing finely dispersed vitamin $D_2$, vegetable oil and stabilizing agents in a starch-coated protective matrix of gelatin and sugar. The vitamin $D_2$ is available for ready assimilation by humans or by animals. The composition may be used per se, blended with other dry vitamins and minerals or combined in multivitamin preparations such as multivitamin capsules or tablets, vitamin enriched powders for flavored drinks, animal feed supplements, etc. The vitamin D powder prepared according to this invention is particularly adapted for use in tablets, especially the multivitamin tablets used in the baking industry and known as bread wafers. The vitamin $D_2$ composition produced according to this invention may be tabletted alone or together with other vitamins and minerals in known manner.

The butylated hydroxyanisole and the 2,6-di-t-butyl-4-methylphenol are used in a proportion of about 5 mg. to about 20 mg., preferably about 10 mg., of each per one million I. U. of vitamin $D_2$. The ethylenediamine tetraacetic acid or alkali metal salt thereof is incorporated in a proportion of about 0.1% to about 0.5%, preferably about 0.2%, by weight of total composition. The gelatin, sugar and vegetable oil are employed in proportions of approximately 50%, 10% and 12%, respectively, based on the weight of the total composition.

The invention is illustrated by the following example.

Example 0.5 gram of butylated hydroxyanisole and 0.5 gram of 2,6-di-t-butyl-4-methylphenol were dissolved in 5.5 grams of corn oil. The mixture was heated and stirred until complete solution was obtained. To the corn oil solution were added 1.3 grams of vitamin $D_2$ crystals (containing 40 million I. U. per gram) under nitrogen atmosphere. The solution was stirred until the vitamin $D_2$ crystals were completely dissolved. 0.1 gram of the disodium salt of ethylenediamine tetraacetic acid were added to the solution with stirring.

The mixture obtained above was added slowly to 50 g. of an aqueous solution of U. S. P. gelatin and the mixture was vigorously agitated. While continuing the agitation, 10.4 g. of an aqueous solution of sucrose and approximately 8 ml. of distilled water were added to the agitated mixture. The mixture was stirred until a thick oil in water emulsion was obtained.

The emulsion thus produced was loaded into an apparatus provided with a revolving spray head and a counter-rotating drum. The drum was loaded with approximately 250 grams of "Dry-Flo" (a commercially available modified starch ester described above) previously dried to a moisture content of about 3%. The emulsion was forced through the revolving spray head and sprayed in the form of fine droplets into an agitated mass of the "Dry-Flo" collecting powder. After all the emulsion had been sprayed into the collecting powder, the mixture of powder and vitamin-bearing particles was allowed to stand for a short time and then screened through a sifter. The vitamin $D_2$-containing particles retained on the screen were separated out on drying trays and dried in an oven at 45° C.

Approximately 50 grams of a dry, free-flowing powder containing vitamin $D_2$ was thus obtained having a particle size in the range of finer than 30 mesh and coarser than 120 mesh and containing approximately one million I. U. per gram of vitamin D activity.

I claim:

1. A stabilized vitamin D composition in dry form comprising vitamin $D_2$, butylated hydroxyanisole in a proportion of about 5 mg. to 20 mg. per million I. U. of vitamin $D_2$, 2,6-di-t-butyl-4-methylphenol in a proportion of about 5 mg. to 20 mg. per one million I. U. of vitamin $D_2$ and about 0.1% to 0.5% by weight of ethylenediamine tetraacetic acid.

2. A stabilized vitamin D composition in dry form comprising vitamin $D_2$, butylated hydroxyanisole in a proportion of about 5 mg. to 20 mg. per one million I. U. of vitamin $D_2$, 2,6-di-t-butyl-4-methylphenol in a proportion of about 5 mg. to 20 mg. per million I. U, of vitamin $D_2$ and about 0.1% to 0.5% by weight of the disodium salt of ethylenediamine tetraacetic acid.

3. A stabilized vitamin D composition in dry form comprising vitamin $D_2$, butylated hydroxyanisole in a proportion of about 10 mg. per one million I. U. of vitamin $D_2$, 2,6-di-t-butyl-4-methylphenol in a proportion of about 10 mg. per one million I. U. of vitamin $D_2$ and about 0.2% by weight of the disodium salt of ethylenediamine tetraacetic acid.

References Cited in the file of this patent

UNITED STATES PATENTS

| | | |
|---|---|---|
| 2,650,895 | Wallenmeyer | Sept. 1, 1953 |
| 2,693,435 | Stieg | Nov. 2, 1954 |
| 2,756,177 | Cannalonga | July 24, 1956 |

FOREIGN PATENTS

| | | |
|---|---|---|
| 262,670 | Switzerland | Oct. 1, 1949 |